(12) United States Patent
Yasuda

(10) Patent No.: US 6,610,956 B1
(45) Date of Patent: Aug. 26, 2003

(54) DEVICE FOR QUALITY DECISION OF A MACHINING STATE OF AN ELECTRIC SPARK MACHINE

(75) Inventor: Osamu Yasuda, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/807,746

(22) PCT Filed: Dec. 2, 1998

(86) PCT No.: PCT/JP98/05428
§ 371 (c)(1),
(2), (4) Date: Apr. 18, 2001

(87) PCT Pub. No.: WO00/32342
PCT Pub. Date: Jun. 8, 2000

(65) Prior Publication Data
(65)

(51) Int. Cl.[7] .............................. B23H 1/00; B23H 7/20
(52) U.S. Cl. ................................... 219/69.13; 219/69.12
(58) Field of Search ........................... 219/69.12, 69.13, 219/69.17; 700/162

(56) References Cited

U.S. PATENT DOCUMENTS

| | | | |
|---|---|---|---|
| 3,705,286 A | * 12/1972 | Kondo et al. ............. | 219/69.13 |
| 3,912,898 A | * 10/1975 | Pfau et al. | |
| 3,975,607 A | * 8/1976 | Ullmann et al. .......... | 219/69.13 |
| 4,581,513 A | * 4/1986 | Obara et al. .............. | 219/69.12 |

FOREIGN PATENT DOCUMENTS

| | | | |
|---|---|---|---|
| JP | 6-8051 | 1/1894 | |
| JP | 61-252022 | 11/1986 | |
| JP | 61-297060 | 12/1986 | |
| JP | 63-267122 A | * 11/1988 | .............. 219/69.13 |
| JP | 1-257516 | 10/1989 | |
| JP | 2-131838 | 5/1990 | |
| JP | HEI 3-35930 | 2/1991 | |
| JP | HEI 3-35931 | 2/1991 | |
| JP | HEI 3-35932 | 2/1991 | |
| JP | HEI 3-35936 | 2/1991 | |
| JP | HEI 3-35943 | 2/1991 | |
| JP | 3-166020 A | * 7/1991 | |
| JP | 5158525 | 6/1993 | |
| JP | HEI 6-8054 | 1/1994 | |
| JP | HEI 7-204942 | 8/1995 | |
| JP | 8-290329 | 11/1996 | |
| JP | 10-97312 A | * 4/1998 | |
| JP | 10-202433 A | * 8/1998 | |

* cited by examiner

*Primary Examiner*—Geoffrey S. Evans
(74) *Attorney, Agent, or Firm*—Sughrue Mion, PLLC

(57) ABSTRACT

A device for quality decision of a machining state of an electric spark machine to apply voltage in a pulse form to a machining space between an electrode and a workpiece for contour machining by pulse discharging includes a plurality of machining state detection apparatus each of which detects a different physical quantity that denotes a machining state. The physical quantity being machining speed, machining voltage, machining current, on and off times of voltage applied to an electrode, total number of discharges, number of abnormal discharges, abnormal discharging rate, and discharging frequency. Furthermore, a machining state evaluation and quality decision apparatus (49) synthetically evaluates the machining state and quality decision of the machining state based on a combination of comparison of the physical quantities detected by the machining state detection apparatus with predetermined standard values for each of the physical quantities.

6 Claims, 8 Drawing Sheets

FIG.8

| MACHINING VOLTAGE \ MACHINING SPEED | -21% OR LESS | −20~ −11% | −10~ +10% | +11~ +20% | +21% OR MORE |
|---|---|---|---|---|---|
| -21% OR LESS | 5 | 4 | 3 | 4 | 5 |
| −20~ −11% | 4 | 3 | 2 | 3 | 4 |
| −10~ +10% | 3 | 2 | 1 | 2 | 3 |
| +11~ +20% | 4 | 3 | 2 | 3 | 4 |
| +21% OR MORE | 5 | 4 | 3 | 4 | 5 |

FIG.12

| DISCHARGING FREQUENCY / ON TIME OF VOLTAGE | -21% OR LESS | −20~ −11% | −10~ +10% | +11~ +20% | +21% OR MORE |
|---|---|---|---|---|---|
| -21% OR LESS | 5 | 4 | 3 | 2 | 1 |
| −20~ −11% | 4 | 3 | 2 | 1 | 2 |
| −10~ +10% | 3 | 2 | 1 | 2 | 3 |
| +11~ +20% | 3 | 2 | 2 | 3 | 4 |
| +21% OR MORE | 2 | 3 | 3 | 4 | 5 |

FIG.13

| TOTAL NUMBER OF DISCHARGES / NUMBER OF ABNORMAL DISCHARGES | -21% OR LESS | −20~ −11% | −10~ +10% | +11~ +20% | +21% OR MORE |
|---|---|---|---|---|---|
| -21% OR LESS | 3 | 3 | 2 | 2 | 1 |
| −20~ −11% | 3 | 3 | 2 | 1 | 2 |
| −10~ +10% | 4 | 3 | 1 | 2 | 3 |
| +11~ +20% | 5 | 4 | 3 | 3 | 3 |
| +21% OR MORE | 5 | 5 | 4 | 3 | 3 |

DEVICE FOR QUALITY DECISION OF A MACHINING STATE OF AN ELECTRIC SPARK MACHINE

This is a Continuation of PCT Application No. PCT/JP98/05428 filed Dec. 2, 1998.

TECHNICAL FIELD

The present invention relates to a device for quality decision of a machining state of an electric spark machine.

BACKGROUND ART

In an electric spark machine, a discharging state display unit showing histograms of the quantities, such as discharging voltage, discharging current, and a peak value of the discharging current, for display of a discharging state of an electric spark machine has been disclosed in Japanese Patent Application Laid-Open gazettes (JP-A No. 3-35930); and an electric spark machining monitoring device with a screen displaying physical quantities, for display of an electric spark machining state, such as average machining voltage, average gap voltage, and machining speed has been published in Japanese Patent Application Laid-Open gazettes (JP-A No. 6-8054).

The above discharging state display unit and electric spark machining monitoring device show only physical quantities denoting a discharging state and a machining state. Therefore, an operator is required to make a quality decision with the above displayed values, based on the rules of thumb, in order to perform quality decision of a machining state, to cause wide varieties of quality decisions.

Though the operator is required to properly perform quality decision using a combination of a plurality of physical quantities denoting a machining state, it is considerably difficult for the operator to properly perform the above evaluation.

As another conventional device, a monitoring device for an electric spark machine, which performs the quality decision by display of physical quantities denoting an electric spark machining state such as machining speed, machining voltage, machining current, on and off times of applied voltage, total number of discharges, number of abnormal discharges, abnormal discharging rate, and discharging frequency, and by comparison between the above physical quantities and predetermined values, has been disclosed in Japanese Patent Application Laid-Open gazettes (JP-A No. 7-204942).

In the above monitoring device, the quality decision of the machining state is automatically performed, but the quality decision is not properly performed, as the quality decision of the machining state is performed based on a single physical quantity such as machining speed and machining voltage. The operator is required to make presumption for proper quality decision using the quality decision results based on a single physical quantity in order to perform proper quality decision using a combination of a plurality of physical quantities denoting a machining state.

It is an object t of this invention to provide a device for quality decision of a machining state of an electric spark machine.

DISCLOSURE OF THE INVENTION

The device for quality decision of a machining state of an electric spark machine according to this invention applies voltage in a pulse form to a machining space between an electrode and a workpiece for contour machining by pulse discharging. This device comprises a plurality of machining state detection means each of which detects a physical quantity denoting individual machining states, the physical quantity detected by any one of the machining state detection means being different from the physical quantity detected by any other of the machining state detection means; and a machining state evaluation and quality decision means which synthetically evaluates a machining state and quality decision of the state based on a combination of a results of comparison of the physical quantities detected by the machining state detection means with predetermined standard values for each of the physical quantities.

Thus, each of the plurality of machining state detection means detects physical quantities denoting individual machining states which are different from each other. Furthermore, the machining state evaluation and quality decision means evaluates the machining states synthetically using a combination of comparison results, for physical quantities, between predetermined standard values for each physical quantity and physical quantities detected by the machining state detection means. Then, proper quality decision of the machining state is performed based on the above evaluation.

Moreover, in the above-mentioned device it is preferable that, the physical quantities are machining speed; machining voltage; machining current; on and off times of voltage applied to an electrode; total number of discharges, number of abnormal discharges; abnormal discharging rate; and discharging frequency. In this case, it is preferable that, the machining state evaluation and quality decision means synthetically evaluates the machining states, using a combination of comparison results for at least two of the physical quantities and performs the quality decision of the machining state.

Thus, the machining state evaluation and quality decision means synthetically evaluates a machining state, using a combination of comparison results, which are made between a standard value predetermined for each physical quantity, and a corresponding physical quantity detected by the machining state detection means for at least two of the following physical quantities and the combination of the comparison result between the machining speed and the machining speed standard value, and that between the machining voltage and the machining voltage standard value. The physical quantities being machining speed, machining voltage, machining current, on and off times of the voltage a applied to the electrode, total number of discharges, number of abnormal discharges, abnormal discharging rate, and discharging frequency. Then, the machining state evaluation and quality decision means performs an appropriate quality decision of the machining state.

Furthermore, in the above-mentioned device it is preferable that, the machining state evaluation and quality decision means classifies the ratio of the physical quantities to the corresponding standard values or the variances of the physical quantity with the corresponding standard values based on their amplitudes into many levels, and performs the quality decision of the machining state based on a combination of these levels.

That is, the ratios of physical quantities to the corresponding standard values or the variances between them are classified for each physical quantity by the machining state evaluation and quality decision means, and stepwise quality decision of a machining state is performed using the combination of the classifications.

Moreover, in the above-mentioned device it is preferable that the standard value of each physical quantity is set according to machining trajectory shapes and machining modes.

Thus, according to machining trajectory shapes and machining modes, standard values are properly predetermined to cause more proper quality decision of a machining state.

Furthermore, in the above-mentioned device it is preferable that the machining state evaluation and quality decision means evaluates each physical quantity based on an average value of the physical quantity during a desired time duration.

That is, the machining state evaluation and quality decision means evaluates physical quantities based on the average values for a fixed time duration, and quality decision of a machining states is properly performed based on the above evaluation.

Moreover, in the above-mentioned device it is preferable that the machining state evaluation and quality decision means evaluates each physical quantity based on an average value of the physical quantity during a fixed section of a machining trajectory or during a fixed line segment.

Thus, the machining state evaluation and quality decision means evaluates physical quantities, using average values for a fixed section or a fixed line segment of the machining trajectory, and proper quality decision of a machining state may be performed based on the above evaluation.

Moreover, in the above-mentioned device it is preferable that the machining state evaluation and quality decision means outputs the result of the quality decision of the machining state to an output device, the output device being a display unit or a printer.

Thus, quality decision results of machining states are output to the output device such as a display unit and a printer by the machining state evaluation and quality decision means, and the quality decision results of the machining states may be understood using the display, printout and so on of the quality decision results.

Moreover, in the above-mentioned device it is preferable that the machining state evaluation and quality decision means divides a machining trajectory line for contour machining, which is displayed on a display unit, into a plurality of areas, and gives each color to respective divided areas of the machining trajectory line according to the quality decision results of the machining state.

That is, the machining state evaluation and quality decision means divides the machining trajectory line for contour machining displayed on the displayed device into a plurality of areas, and gives different colors to each divided area of the machining trajectory line according to the quality decision result for the machining, and then, the quality decision results of machining states may be distinguished for each divided area using the above displayed colors.

BRIEF DESCRIPTION OF THE DRAWINGS

FIG. 8 illustrates an explanatory view of one example of matrix data tables for quality decision by combination of the machining speed and the machining voltage;

FIG. 12 shows an explanatory view of one example of matrix data tables for quality decisions by a combination of on time of voltage and discharging frequency; and FIG. 13 shows an explanatory view of one example of matrix data tables for quality decisions by a combination of total number of discharges and number of abnormal discharges.

BEST MODE FOR CARRYING OUT THE INVENTION

Preferred embodiments of the present invention will be described in detail below while referring to the attached drawings.

Figure 1:
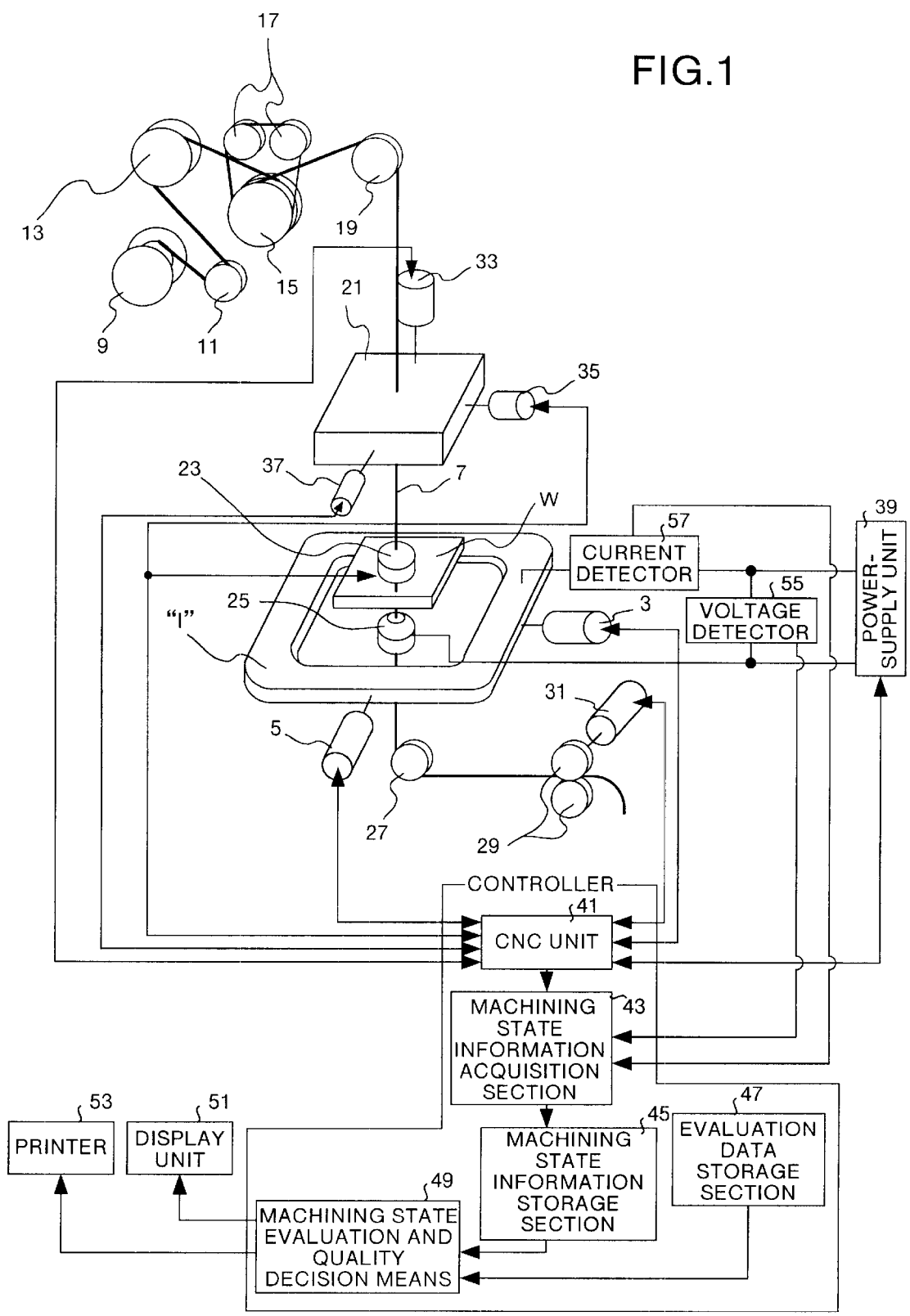
FIG. 1 shows a block diagram of a wire electric spark machine comprising a device for a quality decision of a machining state according to the present invention.

FIG. 1 shows a wire electric spark machine comprising a device for a quality decision of a machining state according to the present invention. The wire electric spark machine comprises a table surface plate 1 mounting a workpiece W, and the above table surface plate 1 is driven in the X axis direction by an X axis servo motor 3, and in the Y axis direction by a Y axis servo motor 5. The position of the table surface plate 1, that is, the machining position is determined by the X axis and Y axis coordinate values.

A wire electrode 7 is paid out from a wire bobbin 9; reaches upper guide 23 with a machining liquid, through a guide pulleys 11, 13, a tension pulley 15, a guide pulleys 17, 19, and a taper application unit 21; further reaches a wire sending collection roller 29 through a lower guide 25 with a machining liquid injection nozzle, and a guide pulley 27 after passing through the workpiece W on the table surface plate 1 in the up and down direction. The wire sending collection roller 29 is driven for rotation by a wire sending collection motor 31 to cause running through the above route.

The taper application unit 21 with a U-V axes device displaces the position of the wire electrode 7 above the workpiece against the upper guide 23, and, at the same time, the lower guide 25, in the case of machining such as taper machining, and machining of arbitrary shapes in the up and down direction; and is connected to a Z axis servo motor 33 to displace the taper application unit 21 and the upper guide 23 in the Z axis direction; to a U axis servo motor 35 to displace them in the U axis direction; and to a V axis servo motor 37 to displace them in the V axis direction.

The lower guide 25 has another function as a power feeding unit to feed electric power to the wire electrode 7, and a power supply unit 39 is conductively connected to the lower guide 25 as the power feeding unit, and the table surface plate 1. The power supply unit 39 applies pulse voltage to between the lower guide 25 and the table surface plate 1, that is, between the wire electrode 7 and the workpiece on the table surface plate 1.

The present wire electric spark machine is numerically controlled, and the X axis servo motor 3, the Y axis servo motor 5, the wire sending collection motor 31, the Z axis servo motor 33, the U axis servo motor 35, the V axis servo motor 37, and the power supply unit 39 are controlled, like conventional ones, by a CNC (computerized numerical control) unit 41 for contour machining of a shape with a dimension by pulse discharging according to a machining program for numerical control.

The device for quality decision of a machining state comprises a machining state information acquisition section 43; a machining state information storage section 45 and an evaluation data storage section 47 using RAM (random access memory) and so on; and a machining state evaluation and quality decision means 49. The machining state evaluation and quality decision means 49 is connected with a display unit 51 with a CRT (cathode ray tube), a LCD (liquid crystal display) and so on, and a printer 53.

The machining state information acquisition section 43 obtains machining speed, machining voltage, machining current, on and off times of voltage applied to the wire electrode 7, total number of discharges, number of abnormal discharges, and discharging frequency as physical quantities denoting a machining state, along with machining mode information, a machining position for electric spark machining, and a machining time. Then, the machining state information acquisition section 43 calculates the abnormal discharging rate using the total number of discharges and the number of the abnormal discharges. Furthermore, the machining state information acquisition section 43 writes the result of the calculation in the machining state information storage section 45.

The machining speed is obtained by input of a derivative value of output of a usual rotary encoder, with which the X axis servo motor 3 and the Y axis servo motor 5 are, from the CNC unit 41; the machining voltage by input of measured voltage values by a voltage detector 55 built in the power supply circuit; the machining current by input of measured current values by a current detector 57 built in the power supply circuit; the on and off times of applied voltage with a discharging time detector built in the power supply circuit; the total number of discharges and the number of the abnormal discharges with the discharging detector built in the power supply circuit; the discharging frequency with a discharging frequency detector built in the power supply circuit, respectively.

The machining state information storage section 45 stores each of the above data (physical quantities) during the machining process every predetermined time such as sampling time, and may store data during a certain machining process or a machining process of a plurality of shapes.

The evaluation data storage section 47 saves standard values determined for each physical quantity, a matrix data table for the machining state, and so on. The standard values determined for each physical quantity are predetermined according to machining trajectory shapes and machining modes, and the matrix data table for quality decision is prepared according to the kinds of the wire electrode, the kinds of the workpiece, and the thickness of the above piece.

The machining state evaluation and quality decision means 49 performs synthetic evaluation and quality decision of the machining state by input of the physical quantities from the machining state information storage section 45; by input of the standard values and the matrix data table for quality decision from the evaluation data storage section 47; by comparison, which is performed every physical quantities, between the above physical quantities stored in the machining state information storage section 45 and the standard values determined for each physical quantity; and by combination of the comparison results for at least two kinds of physical quantities among the above ones.

Step wise classification of the ratios of the physical quantities to the standard values, or the variances for each physical quantity may be performed by comparison between the standard values and the physical quantities with the machining state evaluation and quality decision means 49, and then the step wise quality decision of the machining state may be realized by the above combination of the classifications.

Moreover, the machining state evaluation and quality decision means 49 may perform quality decision of the machining state by evaluation of the physical quantities based on the averaged values for a predetermined time or duration of a predetermined section of the machining trajectory line.

The machining state evaluation and quality decision means 49 outputs the machining state quality decision results to an output unit such as a display unit 51 and a printer 53. The machining state evaluation and quality decision means 49 may give different display colors to respective divided areas of the machining trajectory line according to the machining state quality decision results after division of the machining trajectory line of contour machining displayed on the display unit 51 at the above data output.

How the device for quality decision of the machining state operates will be explained by referring to flow charts shown in FIG. 2 and FIG. 3.

Figure 2:
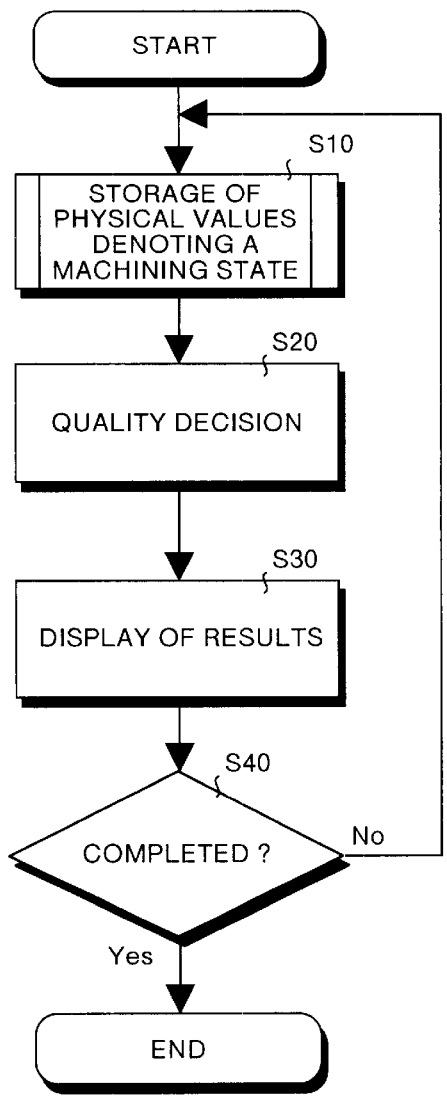
FIG. 2 shows a flow chart of the whole operations of a device for quality decision of a machining state according to the present invention.

The flowchart in FIG. 2 shows the entire operations. To begin with, the above-mentioned physical quantities denoting the machining state are stored in the machining state information storage section 45 (step S10) at the start of machining. Then, the machining state evaluation and quality decision means 49 performs comparison between the standard values and the physical quantities, using the physical quantities stored in the machining state information storage section 45, and the standard values and the matrix data table for quality decision stored in the evaluation data storage section 47, and performs quality decision of the machining state, based on the combinations of the above comparison results (step S20). Then, the quality decision results are displayed on the display unit 51 for the operator to check (step S30).

Thereafter, it is judged whether the machining is completed or not (step S40). If it is decided that the machining is not completed, the process from step S10 is repeated. Thus, an another set of the physical quantities are stored in the evaluation data storage section 47. On the other hand, if it is decided that the machining is completed, the process is stopped.

Figure 3:
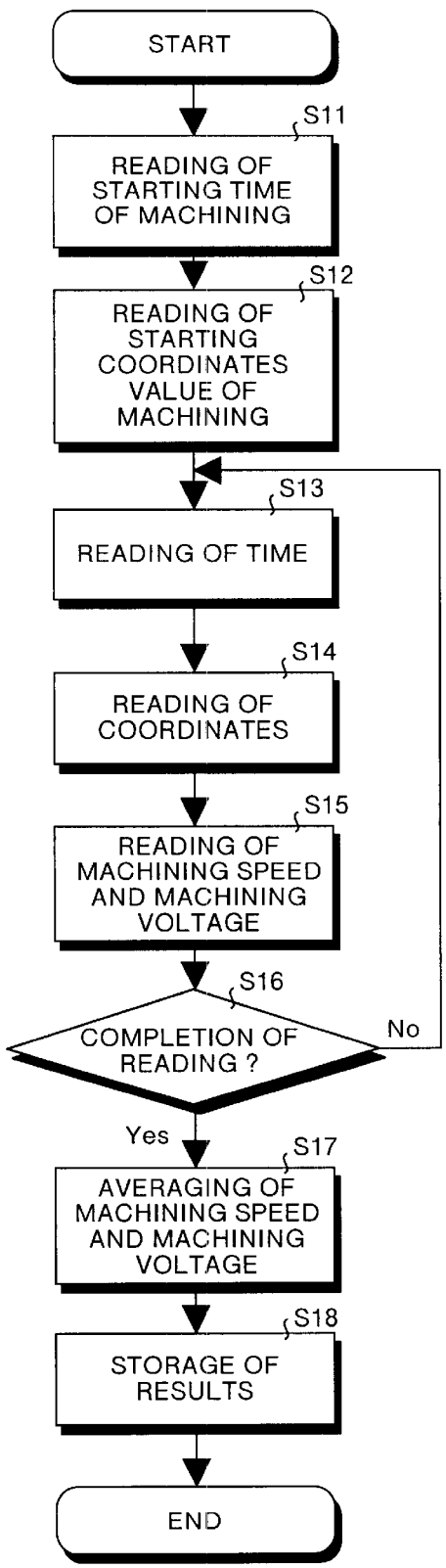
FIG. 3 shows a flow chart of a storing routine of physical quantities in the device for quality decision of a machining state according to the present invention.

The FIG. 3 shows a routine for storage of the physical quantities at step S10 shown in FIG. 2. The storage of the physical quantities involves two types. One is to perform the storage of the physical quantities denoting the machining state at a predetermined intervals during the machining. The other is to do it every line segment of the machining trajectory line or arbitrary length of line segment which may be set every line segment.

At start of machining, the time (starting time of machining), and the coordinate value (starting coordinate value of machining) are stored (step S11 and step S12).

Then, the current time and the current coordinate value after starting of machining are read (step S13 and step S14), and simultaneously with the above reading, machining speed and machining voltage are read as physical quantities denoting the machining state (step S15).

After completion of reading of the above data (step S16), the average values of the machining speed and the machining voltage stored between step S13 and step S15 are subsequently calculated (step S17).

When the storage of the physical quantities denoting the machining state is performed at a predetermined interval, the difference between the time for storage at step S11 and that for reading at step S13 is calculated. If the difference is shorter than the arbitrarily predetermined time, the process is returned to step S13, and if the difference is equal to or longer than the arbitrarily predetermined time, the process proceeds to step S17. Time for from step S13 to step S15 may be arbitrarily set, other than the predetermined time for storage of the physical quantities denoting the machining state, if it is shorter than the predetermined time for storage of the physical quantities denoting the machining state.

When the storage of the physical quantities denoting the machining state is performed every line segment of the machining trajectory line, it is judged whether the coordinate value read at step S14 denotes the shape changing part, for example, from a straight line to a circular arc, or from a circular arc to an arc with a different radius. If not, the process is returned to step S13, and if a changing part, it proceeds to step S17.

When the storage of the machining state is performed every arbitrary length of a line which may be set for each line segment of the machining trajectory line, the length of the line segment is calculated from the coordinate value stored at step S12, and the length of the line read at step S14. When the calculated length is shorter than the arbitrarily predetermined length, the process is returned to step S13, and when the above length is equal to or longer than the arbitrarily predetermined length, the process proceeds to step S17.

The average values of the machining speed and the machining voltage are calculated at step S17, and the calculated results are stored (step S18) for termination.

An embodiment of the device according to this invention will be described in detail below while referring to FIG. 4 to FIG. 11.

Figure 4:
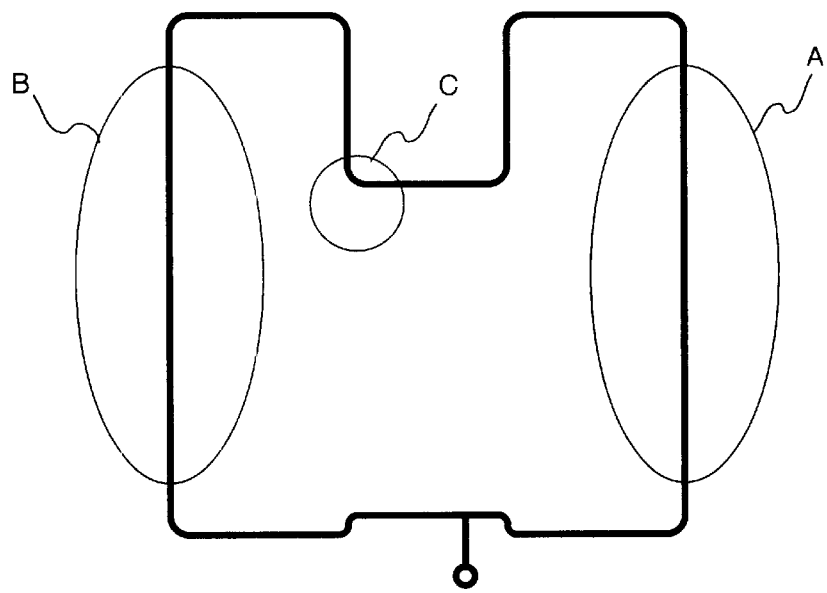
FIG. 4 shows a plan view of an example for machining trajectory shapes during contour machining.
Figure 5:
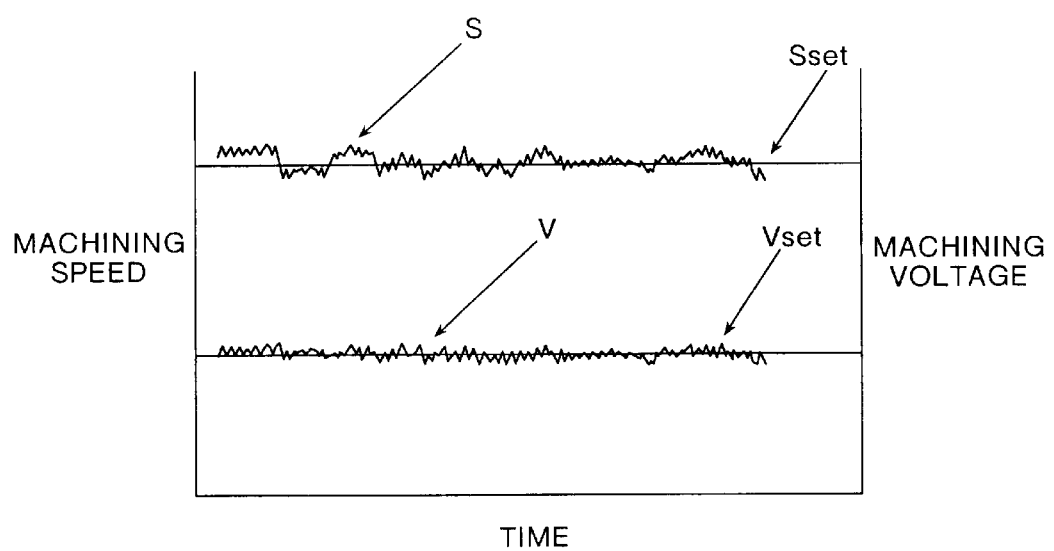
FIGS. 5 to 7 show views of machining speed and machining voltage in each area of the machining trajectory shape shown in FIG. 4.
Figure 6:
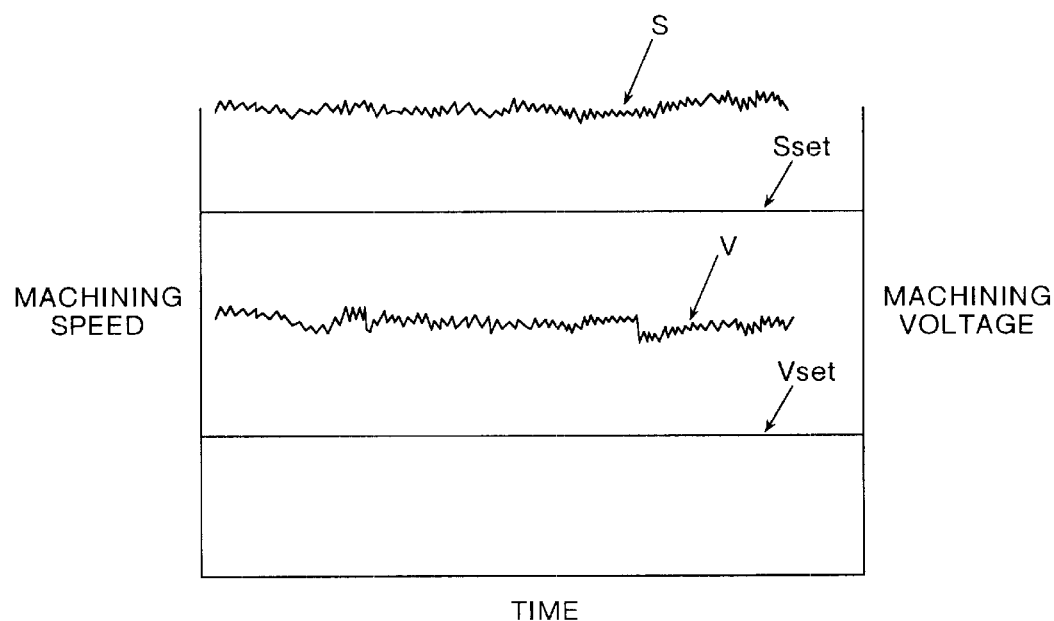
Figure 7:
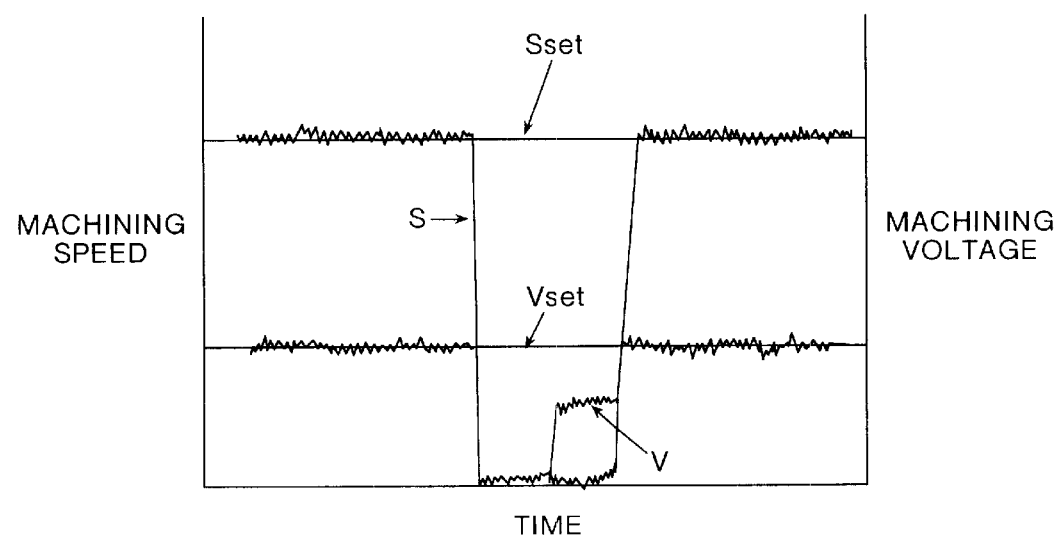

FIG. 4 shows a shape of a machining trajectory line (a punching shape or a die shape) during contour machining, and FIG. 5 to FIG. 7 show views of the machining speed and the machining voltage in the area A (a straight line section), the B area (a straight line section), and the C area (an inward corner part) of the machining trajectory shape shown in FIG. 4, respectively. In FIG. 5 to FIG. 7, the vertical scales show the machining speed and the machining voltage, and the horizontal scales times. Moreover, the horizontal scales may be the circumference of the machining shape or the machining distance. In FIG. 5 to FIG. 7, reference character S denotes machining speed, reference character set denotes machining speed standard value, reference character V denotes machining voltage, and a reference character Vset denotes machining voltage standard value.

The machining speed standard value Sset and the machining voltage standard value Vset may be set according to the thickness of the workpiece. When machining conditions supplied by a manufacturer are used, the above values maybe set according to the data in the manufacturer's conditions, or the data accumulated by the user.

During usual machining, the best prediction of the machining accuracy at completion of the machining may be performed by the machining state, which is denoted by the machining speed, the machining voltage, and so on, at the final machining stage. The machining state evaluation and quality decision means 49 performs quality decision of the machining state, based on the above data. Moreover, though the quality decision is performed only at the final step of the machining, data collection and judgment are performed for the step data on the way.

FIG. 8 shows one example of a matrix data table for quality decision with which the machining state evaluation and quality decision means 49 performs the quality decision. In the above data table, horizontal rows show a ratio of the machining speed to the machining speed standard value Sset; vertical columns the ratio of the machining voltages to the machining voltage standard value Vset; and the numerals in the frames the stepwise quality evaluation: in the present example, five step decision is used, that is, "1" denotes a "good" state, "5" a "poor" state, the nearer numerals to "1" the better state, and the nearer one to "5" the poorer state.

In the present example, the stepwise decision in each frame is assumed to be based on ratios to standard values, but it may be also based on values to or from which a fixed value is added or reduced, respectively. Moreover, though the number of division for stepwise quality evaluation is assumed to be five, the above number may be arbitrarily set according to the situations. And, in the present example, five kinds of numerals are used for quality decision, but arbitrary kinds of numerals may be set for the above quality decision. The above data tables may be prepared according to the kinds of the used wire electrode 7, those of the workpiece W, and the thickness of the above piece.

As shown in FIG. 5, the quality decision is "1", as the machining speed S and the machining voltage V are almost equal to the machining speed standard value Sset and the machining voltage standard value Vset in the machining of the A area; that is, it is denoted that the machining in the A area is made in the almost similar state to that of the standard machining.

As shown in FIG. 6, the machining speed S is faster than the machining speed standard value Sset by about 18%, and the machining voltage V is higher than the machining voltage standard value Vset by about 25% in the machining of the B area. The above shows that the machining is generally in an opening state, and the discharging at the final machining for finishing is not excellently machining the workpiece. The quality decision for the above state is "4" in the data table shown in FIG. 8. It is assumed to be evaluated that the machined result is almost equal to a poor state.

As shown in FIG. 7, the machining speed S is almost equal to 0, and the machining voltage V is reduced by about 20% to the machining voltage standard value Vset, after the above voltage becomes almost 0, in the machining of the C area. The above shows a temporarily short-circuited state, and it is denoted that the electric spark machining itself is not normally performed. As "0" may not be expressed by the multiple, it is assumed for convenience that it is the lowest value in both the machining speed and the machining voltage, and that both of them are within a 21% range. The quality decision of the above state is shown as "5" in the data table in FIG. 8, and it is judged that the machining result is poor.

As shown above, the quality decision of the machining state may be performed online, and then the measurement of the dimension accuracy after completion of the machining may be performed only for specified areas with quality decision of nearly "poor". Therefore, the measurement time at out process may be reduced by the above minimum measurement.

Moreover, it may be possible to notify the quality decision results to the operator at completion of the machining by display of the above results on the display unit 51 to cause efficient measurement of the post processes. In addition, the quality decision results may be used at a place other than the electric spark machine by printout of the quality decision results with the printer 53.

Figure 9:
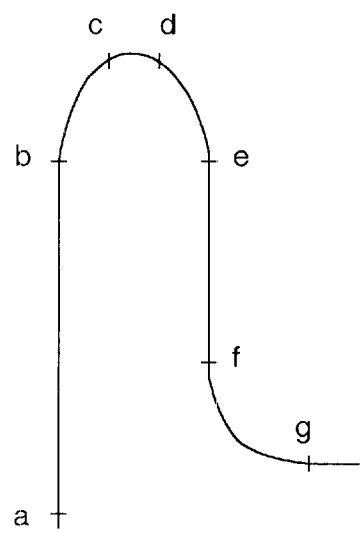
FIG. 9 show a plan view of an example of machining trajectory shapes during contour machining.
Figure 10:
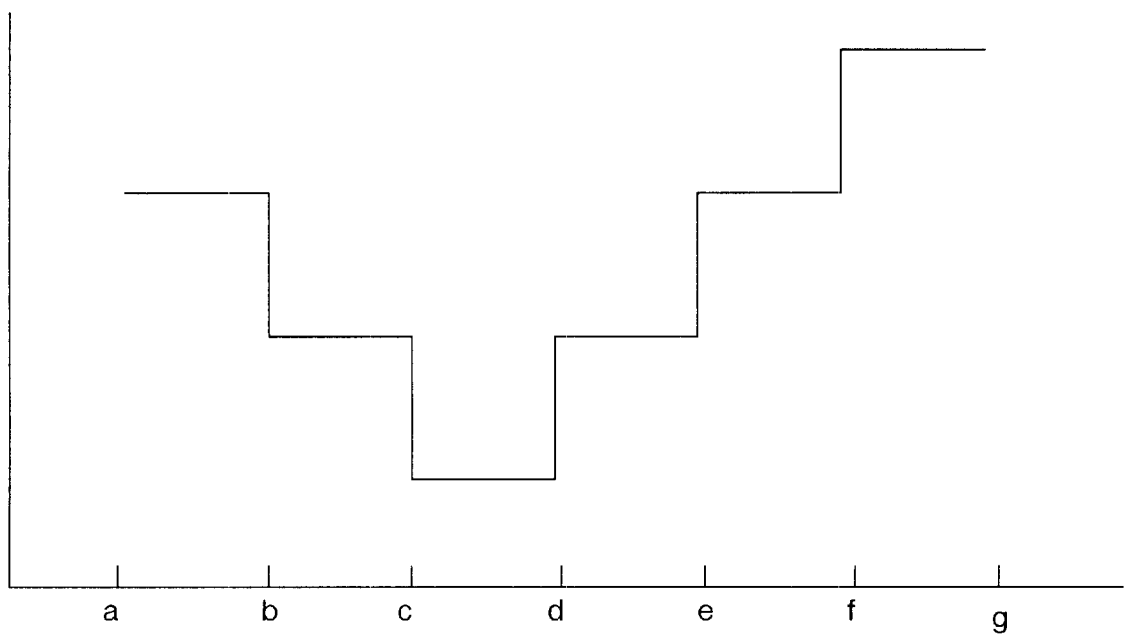
FIG. 10 shows a view of characteristics of standard values which are individually determined for each section.

In case of the machining trajectory shown in FIG. 9, the trajectory may be divided into many sections. These sections being a-b section of a straight line; b-c section of an inward corner with a large radius; c-d section of an inward corner with a small radius; d-e section of an inward corner with a large radius; e-f section of a straight line; and f-g section of an outward corner. As shown in FIG. 10, the standard value Sset of the machining speed and the standard value Vset of the machining voltage may be individually set for each section.

Both values are low at the inward corner, and high at the outward corner, compared with the standard values of the machining speed and the machining voltage at the straight line part. Moreover, the standard values at the corners are changed according to the radius at the above corners, and obtained as results by operations in the CNC unit based on standard values at straight line parts.

Figure 11:
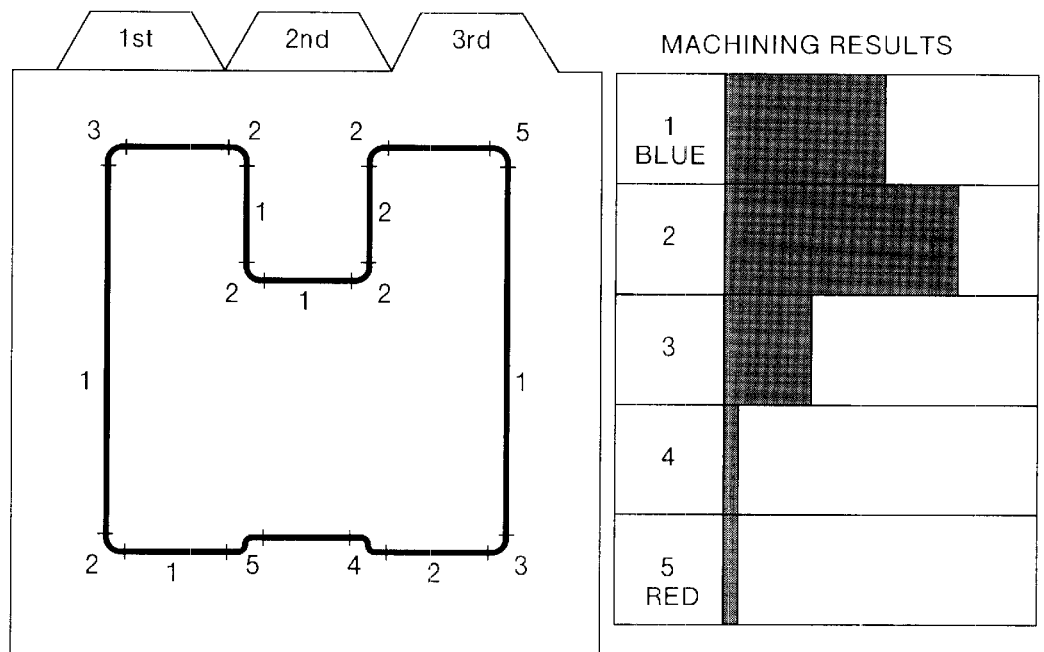
FIG. 11 shows an explanatory view of one display example of quality decision results.

FIG. 11 shows an example of display of the quality decision result. A machining shape (a machining trajectory line for contour machining) is displayed on the screen of the display unit 51, and display colors (blue to red), which are defined according to the number of the stepwise decision used for quality decision of the machining, are given to each of the corresponding parts of the machining trajectory line denoting the shape. The intervals may be properly set, for example, every predetermined time such as a sampling interval during the machining process, or every section of the shape.

A function to display the machining results according to the number of the stepwise decision used for the quality decision is provided, and then, the ratio and the number are displayed, for example, using a bar chart. The operator may perform circumstantial judgment of the machining results by the above displayed results.

As one of output methods of the data for the quality decision results, the displayed results on the screen may be output as it is by connection of the printer 53. Moreover, the above results may be output to a memory such as a RAM installed inside or outside the electric spark machine. The data of the above results may be transferred to a personal computer, a measuring unit, and so on, which are located away from the electric spark machine, by connection of a communication cable.

The combination of the physical quantities for quality decision is not limited to the combination of the machining speed and the machining voltage, and as another combination, there may be combination of, for example, the on time of the voltage and the discharging frequency, and the total number of the discharges and the number of the abnormal discharges. In addition, the number of combined factors is not limited to two, and it may be a combination of a plurality of physical quantities, more than two. The more factors are included for the combination, the more certainty and the more reliability for the quality decision are obtained.

A matrix data table for quality decision in the case of a combination of the on time of the voltage and the discharging frequency is shown in FIG. 12. Furthermore, the above table for the combination of the total number of discharging frequency and the abnormal discharges is shown in FIG. 13. These figures are provided for reference.

INDUSTRIAL APPLICABILITY

As mentioned above, a device for a quality decision of a machining state of an electric spark machine according to the present invention may be used for quality decision of a machining state at wire electric spark machining of punches, dice, and so on.

What is claimed is:

1. A device for quality decision of a machining state of an electric spark machine applying voltage in a pulse form to a machining space between an electrode and a workpiece for contour machining by pulse discharging, said device comprising:

a plurality of machining state detection means each of which detects a physical quantity denoting individual machining states, the physical quantity detected by any one of said machining state detection means being different from the physical quantity detected by any other of said machining state detection means, wherein the physical quantities are: machining speed; machining voltage; machining current; on and off times of voltage applied to an electrode; total number of discharges, number of abnormal discharges; abnormal discharging rate; and discharging frequency, and further wherein the standard value of each physical quantity is set according to machining trajectory shapes and machining modes;

at least one data table, in which quality evaluation of a machining state is previously determined based on ratios of at least two physical quantities detected by the machining state detection means with corresponding standard values; and a machining state quality decision means which performs quality decision of the machining state, based on machining state quality evaluations in the data table ratios of at least two physical quantities with corresponding standard values, wherein said machining state evaluation and quality decision means synthetically evaluates the machining states, using a combination of comparison results for at least two of the physical quantities and performs the quality decision of the machining state.

2. The device for quality decision of a machining of an electric spark machine according to claim 1, wherein said machining state evaluation and quality decision means outputs the result of the quality decision of the machining state to an output device, said output device being a display unit or a printer.

3. The device for quality decision of a machining of an electric spark machine according to claim 1, wherein said machining state evaluation and quality decision means classifies the ratio of the physical quantities to the corresponding standard values or the variances of the physical quantity with the corresponding standard values based on their amplitudes into many levels, and performs the quality decision of the machining state based on a combination of these levels.

4. The device for quality decision of a machining of an electric spark machine according to claim 1, wherein said machining state evaluation and quality decision means divides a machining trajectory line for contour machining, which is displayed on a display unit, into a plurality of areas, and gives each color to respective divided areas of the machining trajectory line according to the quality decision results of the machining state.

5. The device for quality decision of a machining of an electric spark machine according to claim 1, wherein said machining state evaluation and quality decision means evaluates each physical quantity based on an average value of the physical quantity during a desired time duration.

6. The device for quality decision of a machining of an electric spark machine according to claim 1, wherein said machining state evaluation and quality decision means evaluates each physical quantity based on an average value of the physical quantity during a fixed section of a machining trajectory or during a fixed line segment.

* * * * *